United States Patent
McQueen

(10) Patent No.: US 9,542,582 B2
(45) Date of Patent: Jan. 10, 2017

(54) SYSTEM AND METHOD FOR MULTI-VIEW IMAGING OF OPTICAL CODES USING CHROMATIC PATH SPLITTING

(75) Inventor: Alexander M. McQueen, Eugene, OR (US)

(73) Assignee: DATALOGIC ADC, INC., Eugene, OR (US)

( * ) Notice: Subject to any disclaimer, the term of this patent is extended or adjusted under 35 U.S.C. 154(b) by 1674 days.

(21) Appl. No.: 12/730,931

(22) Filed: Mar. 24, 2010

(65) Prior Publication Data

US 2010/0270376 A1 Oct. 28, 2010

Related U.S. Application Data

(60) Provisional application No. 61/172,594, filed on Apr. 24, 2009.

(51) Int. Cl.
*G06K 7/10* (2006.01)
(52) U.S. Cl.
CPC ......... *G06K 7/10722* (2013.01); *G06K 7/1096* (2013.01); *G06K 7/10792* (2013.01)
(58) Field of Classification Search
USPC .................................................. 235/462.11
See application file for complete search history.

(56) References Cited

U.S. PATENT DOCUMENTS

| | | | |
|---|---|---|---|
| 5,161,051 A * | 11/1992 | Whitney | G02B 13/146 244/3.16 |
| 5,418,357 A | 5/1995 | Inoue et al. | |
| 5,912,451 A | 6/1999 | Gurevich et al. | |
| 5,942,762 A | 8/1999 | Hecht | |
| 6,147,358 A | 11/2000 | Hecht | |
| 6,237,851 B1 | 5/2001 | Detwiler | |
| 6,323,503 B1 | 11/2001 | Hecht | |
| 6,568,598 B1 * | 5/2003 | Bobba et al. | 235/462.39 |
| 6,621,063 B2 | 9/2003 | McQueen | |
| 6,726,094 B1 | 4/2004 | Rantze et al. | |
| 6,793,138 B2 * | 9/2004 | Saito | 235/470 |
| 6,899,272 B2 | 5/2005 | Krichever et al. | |
| 6,963,074 B2 | 11/2005 | McQueen | |
| 7,215,493 B2 | 5/2007 | Olmstead et al. | |
| 7,224,540 B2 | 5/2007 | Olmstead et al. | |
| 7,243,850 B2 | 7/2007 | Tamburrini et al. | |
| 7,387,246 B2 | 6/2008 | Palestini et al. | |
| 7,398,927 B2 | 7/2008 | Olmstead et al. | |
| 7,626,769 B2 | 12/2009 | Olmstead | |
| 7,721,966 B2 | 5/2010 | Rudeen et al. | |
| 7,748,631 B2 | 7/2010 | Patel et al. | |
| 2004/0183004 A1 | 9/2004 | Niggemann et al. | |
| 2009/0001166 A1 | 1/2009 | Barkan et al. | |
| 2009/0206161 A1 | 8/2009 | Olmstead | |

* cited by examiner

*Primary Examiner* — Rafferty Kelly
(74) *Attorney, Agent, or Firm* — Stoel Rives LLP

(57) ABSTRACT

An optical code or data imaging system and method for forming image data from an item bearing an optical code present in a read volume, including an image splitter, such as a dichroic mirror, operative to transmit light of a first wavelength range from a first field of view of the item toward the imager and reflect light of a second wavelength range from a second field of view of the item toward the imager. The incoming images from both the first and second fields of view are focused, at least primarily, by the same focusing optics and are detected by the same detecting portions or preferably at least some overlapping portions of the imager.

13 Claims, 4 Drawing Sheets

ILLUMINATION TIMING

DICHROIC MIRROR CHARACTERISTIC

SYSTEM AND METHOD FOR MULTI-VIEW IMAGING OF OPTICAL CODES USING CHROMATIC PATH SPLITTING

RELATED APPLICATION DATA

This application claims priority to U.S. provisional application No. 61/172,594 filed Apr. 24, 2009, hereby incorporated by reference.

BACKGROUND

The field of this disclosure relates generally to systems and methods for data reading, and more particularly but not exclusively to reading of optical codes (e.g., barcodes) using imaging readers. Optical codes encode useful, optically readable information about the items to which they are attached or otherwise associated. Perhaps the best example of an optical code is the barcode. Barcodes are ubiquitously found on or associated with objects of various types, such as the packaging of retail, wholesale, and inventory goods; retail product presentation fixtures (e.g., shelves); goods undergoing manufacturing; personal or company assets; and documents. By encoding information, a barcode typically serves as an identifier of an object, whether the identification be to a class of objects (e.g., containers of milk) or a unique item (see e.g., U.S. Pat. No. 7,201,322). Linear (one-dimensional) barcodes consist of alternating bars (i.e., relatively dark areas) and spaces (i.e., relatively light areas). The pattern of alternating bars and spaces and the widths of those bars and spaces represent a string of binary ones and zeros, wherein the width of any particular bar or space is an integer multiple of a specified minimum width, which is called a "module" or "unit." Thus, to decode the information, a barcode reader must be able to reliably discern the pattern of bars and spaces, such as by determining the locations of edges demarking adjacent bars and spaces from one another, across the entire length of the barcode.

Barcodes are just examples of the many types of optical codes in use today. Linear barcodes, such as the UPC code, are typically considered an example of a one dimensional or linear optical code, as the information is encoded in one direction—the direction perpendicular to the bars and spaces. Higher-dimensional optical codes, such as, two-dimensional matrix codes (e.g., MaxiCode) or stacked codes (e.g., PDF 417), which are also sometimes referred to as barcodes, are also used for various purposes.

Two of the more common types of devices that read optical codes are (1) flying-spot scanners and (2) imager-based readers. The flying-spot scanner type of reader is typically a laser-based barcode reader (also called a scanner), which generates a spot of laser light and sweeps or scans the spot out into a read area and across a barcode label. A laser-based scanner detects reflected and/or refracted laser light from the bars and spaces in a barcode as the laser spot moves across the barcode. An optical detector measures the intensity of the return light as a function of time or position and generates an electrical signal having an amplitude determined by the intensity of the detected light. As the barcode is scanned, positive-going transitions and negative-going transitions in the electrical signal occur, signifying transitions between bars and spaces in the barcode. The electrical signal can be analyzed to determine the arrangement of bars and spaces of the scanned barcode. The bar and space information can be provided to a decoding unit to determine whether the barcode is recognized and, if so, to decode the information contained in the barcode. Other examples of laser-based scanners are disclosed in U.S. Pat. No. 7,198,195.

Imager-based readers operate according to a different principle compared to laser-based scanners. An imager-based reader utilizes a camera or imager to generate electronic image data (typically in digital form) of an entire area. The image data is then processed to find and decode the optical code. For example, virtual scan line techniques are known techniques for digitally processing an image containing a barcode by looking across an image along a plurality of lines, typically spaced apart and at various angles, somewhat like a laser beam's scan pattern in a flying spot scanner.

One advantage of imager-based readers is the ability to produce a high-density image of a scan area and thus are able to read 2-D and high density optical codes. Laser scanners are better suited for reading one-dimensional barcodes and typically have longer depth of field than imager-based readers. Laser scanners are also well suited for multi-plane (e.g. bioptic) reading using complex mirror arrays to generate scan lines from different directions and through windows oriented in different orthogonal planes. The present inventor has recognized that it would be advantageous to have an imaging data reader that possesses the advantages of the different types of readers.

DETAILED DESCRIPTION OF EMBODIMENTS

With reference to the above-listed drawings, this section describes particular embodiments and their detailed construction and operation. The embodiments described herein are set forth by way of illustration only and not limitation. Those skilled in the art will recognize in light of the teachings herein that there is a range of equivalents to the example embodiments described herein. Most notably, other embodiments are possible, variations can be made to the embodiments described herein, and there may be equivalents to the components, parts, or steps that make up the described embodiments.

Figure 1:
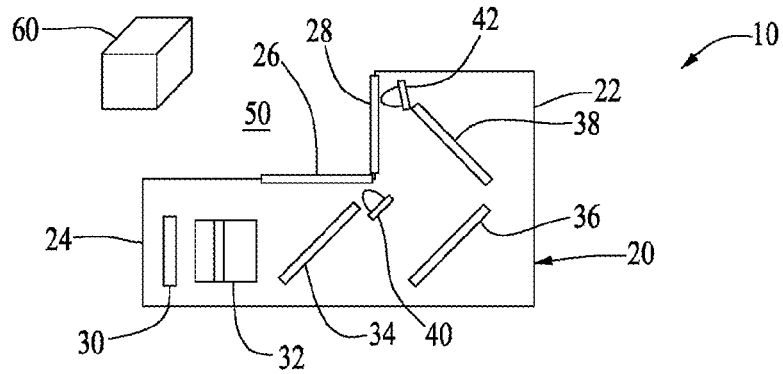
FIG. 1 is a diagrammatic side view of a data reader according to a first embodiment.

FIG. 1 illustrates a data reading system 10 according to a first embodiment. The data reading system 10 includes housing 20 which in this embodiment is illustrated as a bioptic configuration with an upper housing section 22 containing a first window 28 with a generally vertical orientation and a lower housing section 24 containing a second window 26 arranged orthogonal to the first window 28 and in a generally horizontal orientation. Thus the system 10 is shown as a bioptic configuration with the housing having a generally L-shape forming a scan/read volume 50 through which an item 60 such as a six-sided rectangular box-shaped item may be passed. Alternately, the windows 26 and 28 may be combined into a single window, such as a curved window, and still maintain the lower horizontal and upper vertical window configuration. The system 10 may alternately comprise one or more windows disposed in a co-planar arrangement, for example horizontal, and the two views merely be arranged to be directed from different directions through that window.

The data reading system 10 includes a single image sensor shown disposed in the lower housing section 24. Alternately the image sensor 30 may be positioned in any suitable location within the housing 20. Mirrors 34, 36, and 38 are arranged to redirect fields of view from respective windows 26 and 28 onto the image sensor 30. Mirror 34 is a splitting mirror selectively allowing the field of view to be directed out both windows. Generally speaking, the first view of the reader 10 is a two-dimensional (2D) view through window 26, reflecting off of the mirror 34, focused by the focusing lens system 32 and onto the image sensor 30. Simultaneously or alternately/consecutively (as will be described further below), the second two-dimensional view of the reader 10 is a view through vertical window 28, reflecting off of upper mirror 38 then lower mirror 36 and then passing through the splitter mirror 3, focusing by lens system 32 onto the image sensor 30. Thus multiple 2D perspectives/images of objects in the scan volume 50 are produced onto the image sensor.

Figure 2:
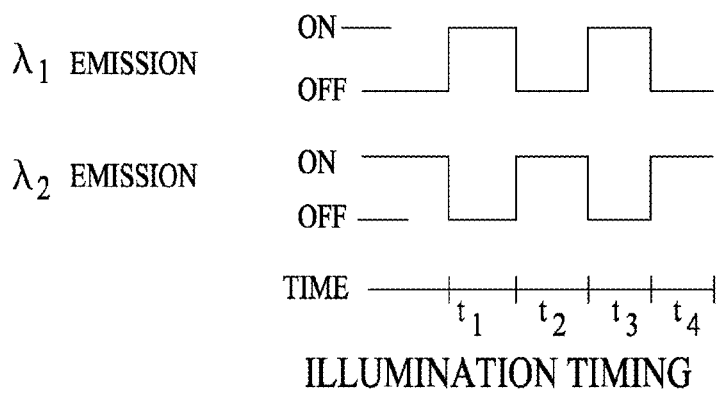
FIG. 2 is a graphical representation of illumination timing for a reader as in FIG. 1.

According to a first embodiment, the mirror 34 comprises a chromatic splitting (or combining) element such as a dichroic mirror or dichroic reflector. Dichroic mirrors, also known as cold mirrors, are highly accurate color reflecting filters used to selectively pass light of one specific range of colors while reflecting other colors. In operation, the scan volume 50 is selectively (in an alternating fashion) illuminated by the first light source 40 or the second light source 42. The first light source 40 generates and passes light of a first wavelength $\lambda_1$ out through the lower window 26 and the second light source 42 passes light of a second wavelength $\lambda_2$ out through the upper window 28 and into the scan volume 50. FIG. 2 illustrates the alternating illumination timing of the first and second light sources 40, 42 whereby the first light source 40 and the second light source 42 are alternately illuminated over time. Thus while the first light source 40 is illuminated during time periods $t_1$ and $t_3$, the second light source 42 is illuminated during time periods $t_2$ and $t_4$. In one example operation, the item 60 in the scan volume 50 is illuminated by the following steps:

During time period $t_1$, illuminating first light source 40 and generating light of wavelength $\lambda_1$, passing wavelength $\lambda_1$ light through the lower window 26 and into the scan volume 50 and illuminating the object 60, reflecting the wavelength $\lambda_1$ light off of object 60 back through the window 26 and reflecting the wavelength $\lambda_1$ light by the dichroic mirror 34 toward the focusing lens system 32, and focusing the wavelength $\lambda_1$ light.

Then during time $t_2$, illuminating second light source 42 and generating light of wavelength $\lambda_2$, passing wavelength $\lambda_2$ light through the upper window 28 and into the scan volume 50 and illuminating the object 60, reflecting the wavelength $\lambda_2$ light off of object 60 back through the window 28 and reflecting the wavelength $\lambda_2$ light off of upper mirror 38 downward to the lower mirror 36, reflecting off the lower mirror 36 to and through the dichroic mirror 34 toward the focusing lens system 32, and focusing the wavelength $\lambda_2$ light onto the imager 30.

Figure 3:
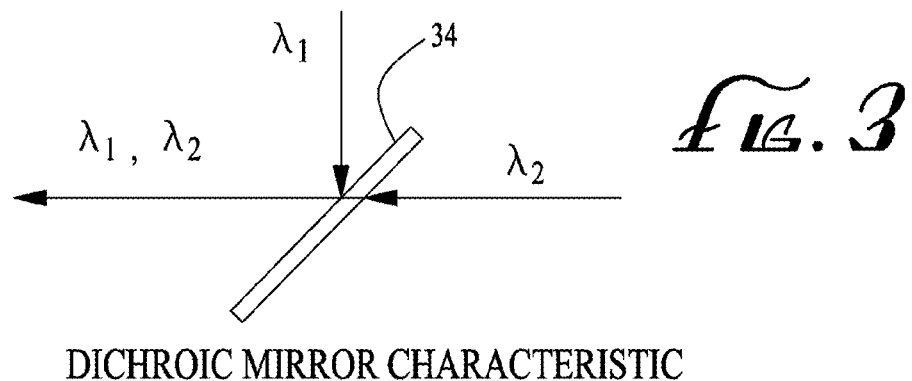
FIG. 3 is a diagram of a dichroic mirror illustrating reflective characteristics.

The dichroic mirror 34 is designed and selected to reflect incoming light of a first wavelength $\lambda_1$ and pass incoming light of a second wavelength $\lambda_2$, thus chromatically combining light of both wavelengths $\lambda_1$, $\lambda_2$ along a common path as shown in the diagram of FIG. 3.

Figure 4:
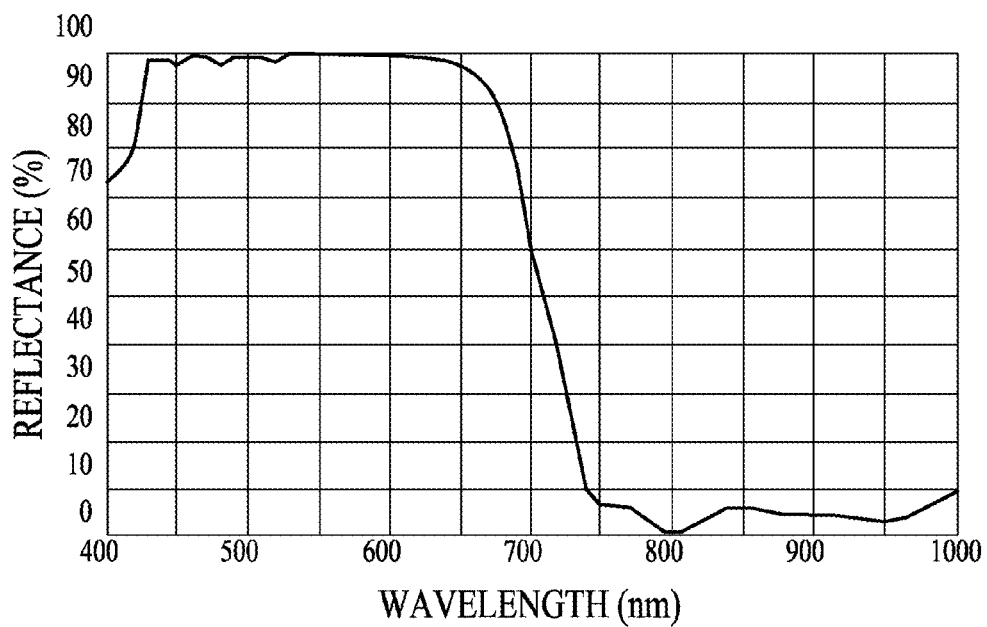
FIG. 4 is a graph of the transmission and reflection properties of a dichroic mirror according to one example.

As previously described, by its properties, the dichroic mirror 34 efficiently reflects light in a first given wavelength range and passes/transmits light of a second given wavelength range. For example, FIG. 4 is a graph of reflection/transmission properties of a dichroic mirror showing high reflectance in a lower wavelength range and a high transmission in an upper wavelength range. Using the dichroic mirror of FIG. 4 as the dichroic mirror 34 of the system of FIG. 1, a system may be configured (in one example configuration) with the light source 40 generating light generally in a range of between about 450 nm to 600 nm (which is in the reflective range of the dichroic mirror of FIG. 4) and with the second light source 42 generating light at a wavelength of about between 750 nm and 1,000 nm (which is in the transmission range of the dichroic mirror of FIG. 4). The angle of the dichroic mirror 34 is shown at about 45 degrees which may be adjusted depending upon the particular reflectance/transmission properties of the specific mirror.

The lens system 32 may be comprised of one or more lenses, filters and/or mirrors to comprise a focusing system as needed for focusing light onto the image sensor 30. Alternately, the fold mirrors 36, 38 or other focusing elements may be employed solely for focusing light coming from the upper window 28 since that light is traveling a greater distance than the light through lower window 26.

In one embodiment, the image sensor 30 is a monochrome sensor of fairly broad range encompassing fully the ranges of the $\lambda_1$ and $\lambda_2$ wavelengths of the light sources 40, 42. Alternatively, by limiting the effectiveness of the image sensor 30 to narrower wavelength ranges, such as by including narrow band filters in the light path, wavelengths outside the light wavelengths generated by the light sources 40, 42 or light from other sources such as ambient illumination, is not formed with sufficient power on the sensor to cause image confusion. Alternately, a color image sensor may be employed and filters may be included in the incoming light path or provided by the lens system 32 to filter out undesirable wavelengths of light from reaching the image sensor 30.

According to one alternate system, the light sources 40, 42 may be illuminated simultaneously and a filtering system be interposed between the dichroic mirror and the image sensor 30 which alternately allows the light of the specified wavelengths to alternately pass. Such a filtering mechanism may comprise, for example, a rotating filter with two different filter regions, an electronic filter, or other suitable mechanism.

In one example method employing a color imager, image data for an optical code on an object in a read volume may be gathered by the steps of:

illuminating a first field of view of the read volume from a first direction with a first light source generating illumination of a first wavelength or wavelength range;

illuminating a second field of view of the read volume from a second direction with a second light source generating illumination of a second wavelength or wavelength range;

accepting light from the first field of view of the read volume from the first direction;

accepting light from the second field of view of the read volume from the second direction;

chromatically combining the first field of view and the second field of view onto a common active area of a color imager by (a) reflecting the light of the first wavelength or wavelength range from the first field of view (b) transmitting the light of a second wavelength or wavelength range from the second field of view;

detecting the first wavelength light and the second wavelength light at a common active area of the color imager to produce first and second signals and processing the first and second signals corresponding to respective 2D images of the first and second fields of view.

Figure 5:
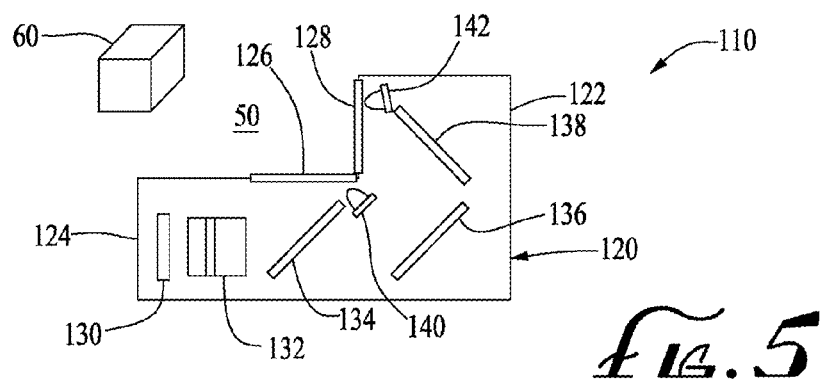
FIG. 5 is a diagrammatic side view of a data reader according to a second embodiment.

FIG. 5 illustrates an alternate configuration for data reading system 110 which is similar to the previous embodiment of FIG. 1. The system 110 includes a housing 120 with a lower housing section 124 and an upper housing section 122 forming a generally L-shaped configuration. The lower housing section 124 includes a lower generally horizontal window 126 and a light source 140 that generates light and passes that light out through window 126 and into the scan volume 50 for illuminating the item 60. Similarly, a second light source 142 is disposed in (or in the vicinity of) the upper housing section, the second light source 142 generating light that passes through upper window 128 generally sidewardly into the scan volume 50 for illuminating the item 60 from a sidewardly direction. Light reflecting off the item 60 passes back through the lower window 126 and is reflected by the dichroic mirror 134, the light then being focused by the lens system 132 projecting a 2D image onto the image sensor 130. Similarly light reflecting off item 60 passes through the upper window 128, is then reflected by the upper mirror 138, and then by lower mirror 136, the light then passing through the dichroic mirror 134, the light being focused by the focusing lens system 132 projecting a 2D image onto the image sensor 130. The light sources 140, 142 are shown located in the housing 120 and thus the light therefrom passes through the respective windows 126, 128 but alternately the light sources may be positioned external to the housing and thus the light need not pass through the window.

In the system 110, the image sensor 130 is a color image sensor which incorporates sensors for different color ranges (e.g. red, blue and green wavelength ranges). The light sources 140 and 142 may be white light sources (i.e. non-monochromatic) or multiple/mixture of sources, or the light may be the prevailing light in the vicinity of the scanner (i.e., ambient light) illuminating the item 60 within the read volume 50. In one configuration, the dichroic mirror 134 may be designed/selected to split between two wavelengths, for example reflect blue wavelength light and transmit red wavelength light. The signal at the color image sensor 130 (both the blue light signal and the red light signal) would then be processed, knowing that the blue light signal corresponds to the 2D image coming from the upper window 128 passing through the dichroic mirror 134 and then process the red light signal knowing that the red light corresponds to the 2D image coming through the window 126 reflecting off the dichroic mirror 134. The light being directed onto the color image sensor includes both color wavelengths focused onto common active areas of the sensor. The color imager may accept both wavelengths at the same time (meaning both wavelengths are acquired in the same image capture) onto common active regions because the color imager includes active pixel areas for the different colors/wavelengths. The different wavelengths may then be processed separately, either sequentially or in parallel.

Thus far, the described embodiments employ an image sensor array or camera providing 2D view of the read volume. Other types of image view system may be employed. For example, Olmstead U.S. Published Application No. Publication No. US-2009-0206161 ("Olmstead '161"), hereby incorporated by reference, discloses a system/method whereby the image plane is divided into a plurality of strip-shaped sections on the sensor thereby, in certain embodiments, mimicking a laser scanner scan pattern. Olmstead '161 refers to these strip-shaped pattern view systems as kaleidoscopic. Thus in one alternate configuration, the dichroic splitter of the present application could switch reading as between (a) a 2D image view of the scan volume and (b) a strip-shape sectional imager (kaleidoscopic) system.

Figure 6:
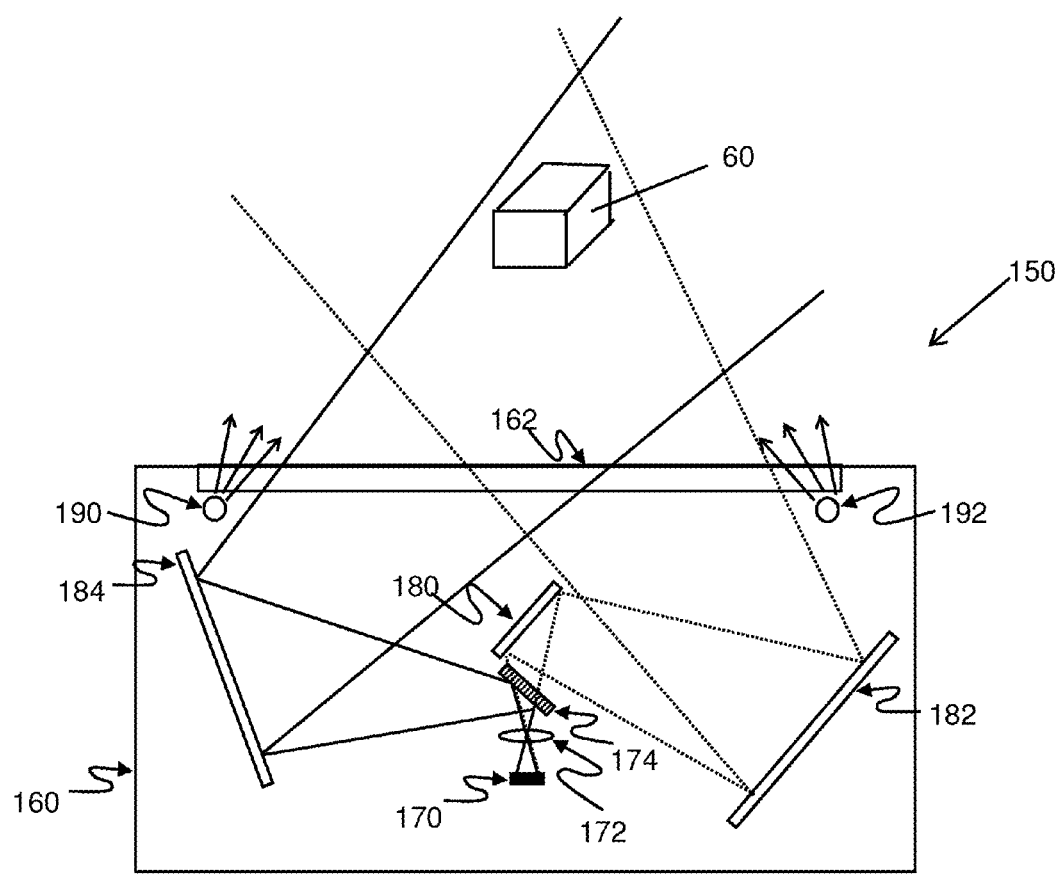
FIG. 6 is a diagrammatic side view of a data reader according to a third embodiment.

FIG. 6 illustrates a data reading system 150 according to an alternative embodiment containing a single window 162 disposed in a generally horizontal orientation. Alternately, the housing 160 may be positioned such that the window 162 is oriented vertically. In the previous embodiment, the reader 150 has views of an item 60 being passed through the read volume from multiple directions. The reader has a first view of the item from the first mirror 184 and towards a dichroic mirror 174. As in the previous embodiment, the dichroic mirror 174 reflects light in a first wavelength range and passes light in a second wavelength range. A light source such as LED 190 produces light in the first wavelength range as reflected off the item back through the window 162, reflected by mirror 184 and then to the dichroic mirror 174. Light in the first wavelength range is reflected off the dichroic mirror 174 and is focused by the focusing system 172 projecting a 2D image onto the imager 170. Similarly, from the other side in a second direction, light from light source 192 is directed out through the window 190 to illuminate the item 60 with light of a second wavelength range. Light of the second wavelength range reflects off the item 60, passes through the window 162, and is then reflected by mirror 182 toward fold mirror 180 and then toward the dichroic mirror 174. Light of the second wavelength range passes through the dichroic mirror 174 and then is focused by the lens focusing system 172, projecting a second 2D image onto the imager 170.

Figure 7:
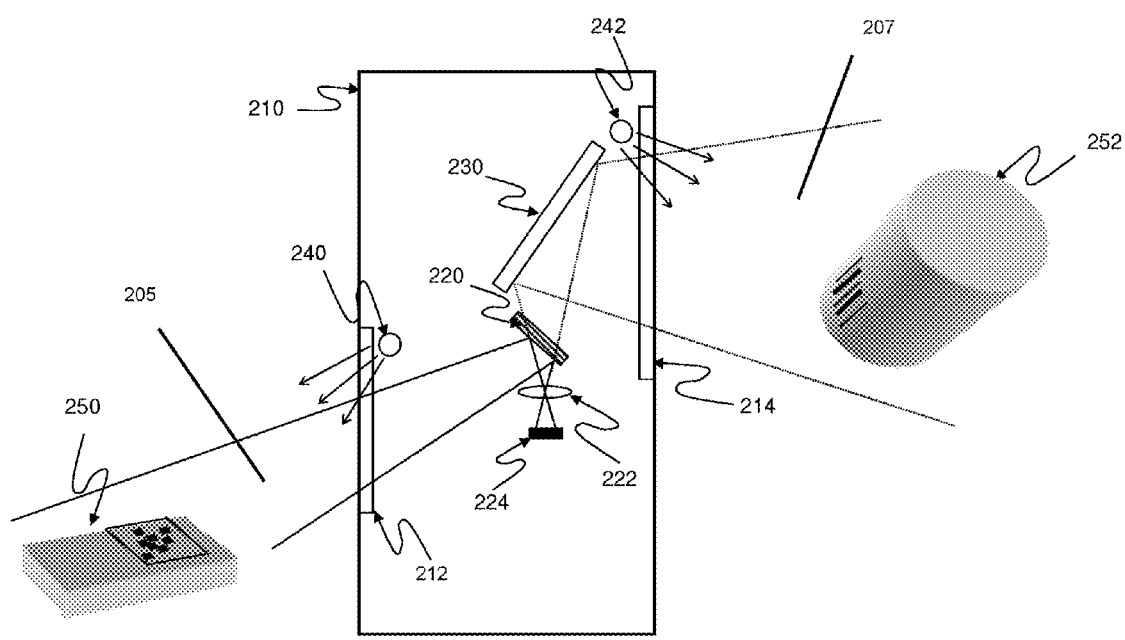
FIG. 7 is a diagrammatic side view of a data reader according to a fourth embodiment.

FIG. 7 illustrates yet another alternate configuration for an imaging reader 200. The reader 200 includes a housing 210 which may be operable in either a handheld, fixed, or combination handheld/fixed data reader. As a combination handheld/fixed reader, it may be operable in similar fashion to the Datalogic model Duet® scanner. Such a combination handheld/fixed data reader 200 may be suitable for various applications such for use in a retail establishment such as convenience stores. The reader 200 includes a first window 212 on one side (e.g., rear side) of the housing 210 and a second window 214 on another side (e.g., front side) of the housing 210. The windows 212, 214 may be disposed on different sides as well as different positions than that illustrated. The windows 212, 214 may be rectangular (as illustrated), oval or other suitable shape and of any suitable size/dimension. A first light source 240 disposed on one side of the housing 210, in the vicinity of the first window 212, generates light that passes through first window 212 generally sidewardly into a first scan volume 205 for illuminating the item 250 from a sidewardly direction. Similarly, second light source 242 disposed on another side of the housing 210, in the vicinity of the second window 214, generates light that passes through second window 212 generally sidewardly into a second scan volume 207 for illuminating the item 252 from a sidewardly direction. Light reflecting off the item 250 passes back through the first window 212 and (being of a first wavelength $\lambda_1$) is reflected by the dichroic mirror 220, the light then being focused by the lens system 222, projecting a first 2D image onto the image sensor 224. Similarly light reflecting off item 252 passes through the second window 214, is then reflected by the upper mirror 230 downwardly through the dichroic mirror 134 (the light being of the wavelength $\lambda_2$), the light being focused by the focusing lens system 222, projecting a second 2D image onto the image sensor 224. The light sources 240, 242 are shown located in the housing 210 and thus the light therefrom passes out through the respective windows 212, 214 but alternately the light sources may position external to the housing and thus the light need not pass through a window.

One advantage that may be realized by certain embodiments disclosed herein is that the incoming signal from each of the views may engage the entire sensor array. Other designs such as disclosed in Olmstead '161 typically split the views from the respective windows onto separate sections of the sensor or to multiple sensor. For example, in FIG. 36A of that Olmstead '161 application, a system 3600 includes a bi-optic splitting mirror 3620, and some representative pattern mirrors and/or redirection mirrors 3630-3680, whereby the bi-optic splitting mirror 3620 is disposed to redirect half of the imager's field of view to the horizontal window 804A portion of the reader 3600, while the other half of the imager's field of view services the vertical window 804B. As for multiple sensors, FIG. 34 of Olmstead '161 illustrates a two camera/sensor system 3400 having a first camera 806 employing a kaleidoscopic (strip-shaped) portion and a second 2D camera 3410 that views a 2D view of the read volume via optional fold mirror 3420.

In another alternate embodiment, the field of view splitting design of the Olmstead '161 application may be incorporated herein. For example, in a single window configuration, a light source generating a first wavelength $\lambda_1$ is directed out of the window, and a full image of the read volume (or primary portion thereof) is reflected off of the dichroic mirror and then focused onto the sensor array. A second light source (or plurality of light sources) of a wavelength $\lambda_2$ is formed according to the kaleidoscopic mirror configuration as in the Olmstead '161 application creating the "image scan pattern" whereby the incoming image of the fields of view (scan line images) of wavelength $\lambda_2$ pass through the dichroic mirror and are focused onto the various sections of the sensor array.

In the above-described embodiments, the light sources are optional as the system may be operable using ambient lighting. If the light sources are employed, the light sources may both comprise white light (i.e., broad band light spectrum) or the two light sources may have light of different wavelength ranges as described above. Each light source may comprise one or more LED's or other suitable lighting element. Alternately, the read volume may be illuminated with a single illumination source, such as a non-coherent light source generating white light.

Though the present invention has been set forth in the form of certain example embodiments, it is nevertheless intended that modifications to the disclosed systems and methods may be made without departing from inventive concepts set forth herein.

The invention claimed is:

1. An optical code reading system for forming image data from an item bearing an optical code present in a read volume, the system comprising:
   an imager;
   a dichroic mirror;
   a first optical path for a first field of view of the item from a first direction directed onto a first side of the dichroic mirror;
   a second optical path for a second field of view of the item from a second direction directed onto a second side of the dichroic mirror opposite the first side, wherein the dichroic mirror is operative to (a) transmit therethrough light of a first wavelength range from the first field of view of the item toward the imager and (b) reflect light of a second wavelength range from the second field of view of the item toward the imager;
   a focusing system for focusing the light of both the first wavelength range and the second wavelength range onto a common active area of the imager, wherein the imager acquires a 2D image of the first field of view and a 2D image of the second field of view;
   a first light source generating first illumination light in the first wavelength range for illuminating the item from a first direction;
   a second light source generating second illumination light in the second wavelength range for illuminating the item from a second direction,
   wherein the first and second light sources are controlled to illuminate in an alternating fashion.

2. A system according to claim 1 wherein the imager comprises a monochrome imager.

3. A system according to claim 1 wherein the imager comprises a color imager and wherein signal from the color imager is processed by processing the signal from light detected in the first wavelength range sequentially from processing the signal from light detected in the second wavelength range.

4. A system according to claim 1 further comprising a housing having a generally L-shape configuration with a horizontal window and a vertical window, wherein the first field of view passes through one of the vertical window and the horizontal window and the second field of view passes through the other window.

5. A system according to claim 4 further comprising a first mirror set comprised of one or more mirrors for routing light passing through the vertical window to the dichroic mirror.

6. A system according to claim 1 wherein the first wavelength range and the second wavelength range are non-overlapping.

7. A system according to claim 1 further comprising
   a housing having a generally L-shape configuration with a lower housing portion containing a horizontal window and an upper housing portion containing a vertical window;
   a first mirror set comprising a first upper mirror and a second upper mirror, wherein the first field of view of the read volume passes through the vertical window and is reflected downwardly from the first upper mirror to the second upper mirror and then from the second upper mirror to the dichroic mirror,
   wherein the second field of view of the read volume passes through the horizontal window and is reflected by the dichroic mirror to the focusing system.

8. A system according to claim 1 further comprising
   a housing having a window;
   a first mirror set comprising a first primary mirror and a first secondary mirror, wherein the first field of view of the read volume passes through the window and is reflected by the first primary mirror to the first secondary mirror and then from the first secondary mirror to the dichroic mirror, a second mirror set comprising a second primary mirror, wherein the second field of view of the read volume passes through the window and is reflected by the second primary mirror to the dichroic mirror.

9. A system according to claim 1 further comprising a housing having a first window and a second window facing in different directions; a first mirror set comprising a first primary mirror, wherein the first field of view of the read volume passes through the first window and is reflected to the dichroic mirror, wherein the second field of view of the read volume passes through the window and is reflected by the dichroic mirror to the focusing system.

10. An optical reading system for generating image data for an optical code on an object in a read volume, comprising:

a dichroic mirror having a first mirror side and a second mirror side opposite the first mirror side;

a first light source operative to generate illumination of a first wavelength or wavelength range and illuminate a first field of view of the read volume from a first direction;

a second light source operative to generate illumination of a second wavelength or wavelength range and illuminate a second field of view of the read volume from a second direction, wherein the first and second light sources are controlled to illuminate in an alternating fashion;

the dichroic mirror being operative to chromatically combine the first field of view of the read volume from the first direction and the second field of view of the read volume from the second direction onto a common active area of a color imager by (a) reflecting the light of the first wavelength or wavelength range from the first field of view impinging on the first side of the dichroic mirror and (b) transmitting the light of the second wavelength or wavelength range from the second field of view impinging upon the second side of the dichroic mirror, thereby combining light of both the first and second wavelengths or wavelength ranges along a common path to the color imager, wherein the first wavelength light and the second wavelength light are detected at the color imager to produce first and second signals corresponding to respective 2D images of the first and second fields of view.

11. A system according to claim 10 wherein the signals from the color imager are processed by processing the first signal from light detected in the first wavelength range sequentially from processing the second signal from light detected in the second wavelength range.

12. A system according to claim 10 further comprising a housing having a generally L-shape configuration with a horizontal window and a vertical window, wherein the first field of view passes through one of the vertical window and the horizontal window and the second field of view passes through the other window.

13. An optical reading system for generating image data for an optical code on an object in a read volume, comprising:

an imager;

a first light source generating first wavelength light in a first wavelength or wavelength range for illuminating the item from a first direction;

a second light source generating second wavelength light in a second wavelength or wavelength range for illuminating the item from a second direction, wherein the first and second light sources are controlled to illuminate in an alternating fashion;

means for directing light from a first field of view of the read volume from the first direction onto a first side of a dichroic mirror;

wherein the dichroic mirror is operative for reflecting first wavelength light from the first field of view of the first wavelength or wavelength range and for passing the first wavelength light onto the imager;

means directing light from a second field of view of the read volume from the second direction onto a second side of the dichroic mirror opposite the first side;

wherein the dichroic mirror is operative for transmitting second wavelength light from the second field of view of the second wavelength or wavelength range through the dichroic mirror and passing the second wavelength light onto the imager;

wherein the imager is operative for detecting the first wavelength light and the second wavelength light to produce first and second signals and wherein the first and second signals are processed corresponding to 2D images of the first and second fields of view.

* * * * *